3,027,385
ACYLOXYLATED DERIVATIVES OF STEROIDS
AND METHOD OF PREPARING SAME
Robert Joly, Montmorency, Julien Warnant, Neuilly-sur-Seine, and Gerard Nomine, Noisy-le-Sec, France, assignors to Les Laboratoires Francais de Chimiotherapie, Paris, France, a body corporate of France
No Drawing. Filed June 20, 1957, Ser. No. 667,045
Claims priority, application France June 25, 1956
10 Claims. (Cl. 260—397.45)

This invention refers to a method of preparing acyloxylated derivatives of steroids. More particularly, the present invention relates to a practically quantitative acyloxylation process of steroids by the direct action of the alkali metal salt of an organic acid on the brominated derivative of a steroid without passing through an iodinated intermediate in a solvent mainly consisting of dimethylformamide, according to the reaction equation:

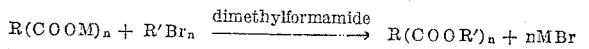
$$R(COOM)_n + R'Br_n \xrightarrow{\text{dimethylformamide}} R(COOR')_n + nMBr$$

In the above formulas, R represents an alkyl radical, for example: methyl, tertiary butyl, a cyclopentyl-alkyl, aryl or aralkyl radical, and $n$ is a multiple of 1 ranging from 1 to 4; M is an alkali metal, such as sodium, potassium or lithium, and R′ is a steroid molecule of the genin group and their decomposition or degradation products, of the sterol group and their decomposition products, of the biliary acid group and their decomposition products, of pregnanes or allo-pregnanes, etiocholanes or androstanes, of 19-nor compounds or the derivatives of the aldosterone family carrying an oxygenated group at the 18-position. Said steroid molecule may, consequently, belong to the normal series, i.e., A and B nuclei being in the cis-position, or to the allo series, i.e., A and B nuclei being in the trans-position, and may comprise, in addition to the usual substituents such as free or substituted ketone, aldehyde, hydroxyl or carboxyl groups, one of several halogen atoms that may or may not be identical.

Since research work carried out during the past years has made it easy to introduce bromine into the 21-, 2-, 4-, 7-, 9-positions of different steroid molecules, it is of interest to be able to use a process which permits the commercial conversion of said halogenated or brominated derivatives into acyloxylated derivatives, among which the esters at the 21-position of suprarenal-gland cortex hormones have become of considerable commercial importance. The production of these compounds passes almost always through the brominated derivative at the 21-position, and the process according to the invention herein makes it possible to introduce with ease, in the place of this halogen atom, the desired acyl radical instead of passing, as is often done, through the 21-acetate which is saponified and then again acylated by means of the desired acyl radical, this latter method being frequently used to produce compounds of delayed activity, such as hexahydrobenzoates, cyclopentylpropionates or tertiary butyl acetates. The new process herein thus saves several reaction steps heretofore used.

With respect to the production of acetates at the 21-position the new process has the advantage over previously known methods of producing very high yields on any scale and of obviating a preliminary replacement of the bromine at the 21-position by iodine according to the process described by P. L. Julian and W. J. Karpel, J. Am. Chem. Soc., 1950, 72, 362.

Finally, and this is one of the most interesting points of the process according to the invention, it becomes possible to selectively acyloxylate a di- or polybrominated steroid molecule and to produce, for example, by starting from a 4,21-dibrominated derivative, a 4-bromo 21-acyloxylated derivative. In its Patents Nos. 2,768,189 and 2,768,191 and its patent application No. 577,321 of April 10, 1956, now Patent No. 2,888,473, the applicants have described compounds, which may be changed into mono- or di-acyloxylated derivatives by means of the new process herein disclosed. In fact, it has been found that a halogen at the 21-position reacts preferably when cold, up to about 25° C. When hot, on the other hand, the bromine at the 4- or other positions is also replaced by the acyl group desired. In order to carry out this process in practice, a solution of the brominated steroid in aqueous or anhydrous dimethylformamide is prepared, possibly in the presence of a third solvent, and the alkali metal salt of the desired acid is introduced into this solution. In most cases it is sufficient to heat to 60–100° C. for two hours, preferably under inert atmosphere, and to pour the reaction product into water in order to obtain the desired acyloxylated steroid with practically quantitative yields. Instead of pouring the acyloxylated steroid into water, it may also be directly crystallized by cooling its solution in dimethylformamide. In the case of selective acyloxylation, the bromine at the 21-position is first caused to react, while cold, for 4 to 48 hours. When the first acyloxylation has been carried out, and after the compound has been isolated, another acyloxy group may be introduced, for example, at the 4- or 7-position, in the place of the bromine, while the solution is hot. This produces a steroid comprising two different ester groups. It is to be noted that while bromine is referred to hereinabove, the other halogens may be also used.

The accompanying diagrams forming part of this description show the formulas of the initial halogen products and the acyloxylated derivatives produced in sequence.

It will be noted that the diagrams represent flow sheets of the reactions hereinafter described in the succeeding examples which are indicated by Roman numerals I to IX therein.

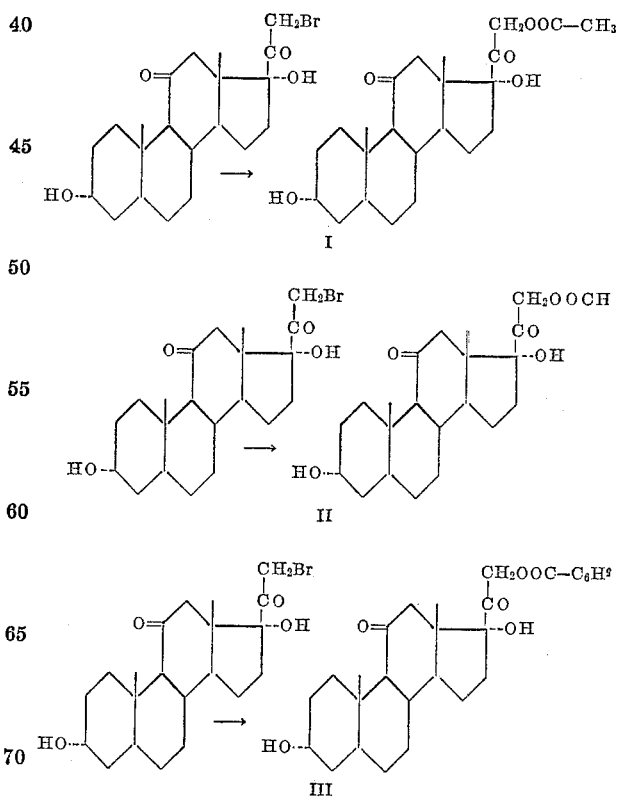

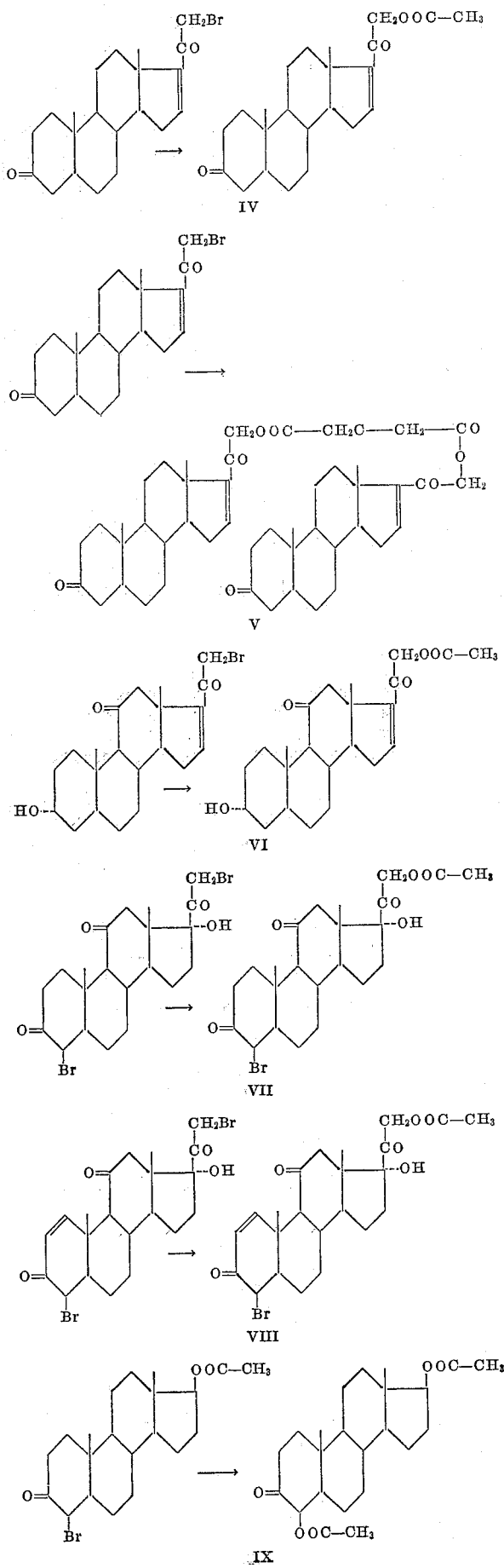

The following examples serve to illustrate the invention without, however, limiting its scope. It is, in particular, possible to use brominated derivatives other than those mentioned in the examples or substituted in other positions, to reflux dimethylformamide or to reverse the order in which the products are introduced without thereby exceeding the scope of the invention.

The melting points are instantaneous melting points determined on the Maquenne block with the exception of those indicated as having been determined in capillary tubes.

EXAMPLE 1

*Preparation of 3α,17α-Dihydroxy 21-Acetoxy Pregnane 11,20-Dione Starting from 21-Bromo 3α,17α-Dihydroxy Pregnane 11,20-Dione. See Reaction I in the Flow Sheet*

50 g. of 21-bromo 3α,17α-dihydroxy pregnane 11,20-dione, having a melting point of 215° C., are dissolved in 250 cc. of dimethylformamide, and 25 g. of anhydrous sodium acetate are introduced into this solution under a stream of nitrogen with continuous stirring. The solution is then heated to 60° C. and kept at this temperature for two hours while stirring and the gaseous stream is continued, after which it is then poured into about two liters of water. The resultant precipitate is separated, for example, by cenrifuging, washed with water and then dried.

There are produced, according to the reaction, 45.3 g. of 3α,17α-dihydroxy 21-acetoxy pregnane 11,20-dione, or a yield of 96.8%. It has a melting point (in a tube) = 224° C., $[\alpha]_D^{20} = +73.5°$ (c=1% acetone). Its analysis shows the formula and molecular weight as $C_{23}H_{34}O_6 = 406.5$—

As calculated: C=67.95%; H=8.43%.
As found: C=68.0%; H=8.4%.

Following the same method of working, but using instead of sodium acetate the equivalent quantity of potassium acetate or lithium acetate, the same product with identical yield is obtained.

This product has been described by S. Kaufmann, G. Rosenkranz and J. Pataki, in U.S. Patent No. 2,596,563, dated May 13, 1952.

EXAMPLE 2

*Preparation of 3α,17α-Dihydroxy 21-Formyloxy Pregnane 11,20-Dione Starting from 21-Bromo 3α,17α-Dihydroxy Pregnane 11,20-Dione. See Diagram II in the Flow Sheet.*

4 g. of sodium formate are added to 50 cc. dimethylformamide, and the solution thus obtained is heated to 60° C. under nitrogen atmosphere. 10 g. of 21-bromo 3α,17α-dihydroxy pregnane 11,20-dione are introduced into the solution with constant stirring, during which the temperature is maintained at 60° C. for two hours while the stirring and the introduction of gaseous stream of nitrogen are continued. The solution is then poured into water. The precipitate which has formed is separated by centrifuging, and is then washed with water and dried.

There are produced 9 g., or a yield of 98%, of 3α,17α-dihydroxy 21-formyloxy pregnane 11,20-dione.

After recrystallization in ethanol the product has a melting point=245° C., $[\alpha]_D^{20} = +70°$ (c=1%, acetone). Its analysis shows the formula and molecular weight as $C_{22}H_{32}O_6 = 392,48$—

As Calculated: C=67.32%; H=8.22%; O=24.45%.
As found: C=67.1%; H=8.1%; O=24.5%.

This is a new product and has not been described in literature heretofore.

EXAMPLE 3

*Preparation of 3α,17α-Dihydroxy 21-Benzoyloxy Pregnane 11,20-Dione Starting from 21-Bromo 3α,17α-Dihydroxy Pregnane 11,20-Dione. See Diagram III in the Flow Sheet.*

The method described in Example 2 above is followed, but a solution of 8 g. of sodium benzoate in 50 cc. dimethylformamide and 10 g. of 21-bromo 3α,17α-dihydroxy pregnane 11,20-dione are used, thereby producing 11 g. of 3α,17α,21-benzoyloxy pregnane 11,20-dione having a melting point=218° C., or a yield of 100%. The product is sufficiently pure to be transformed into cortisone benzoate by oxidation of the secondary alcohol group at the 3-position and the formation of the 4,5-double bond according to methods known per se.

After recrystallization in ethanol, the product has a melting point=225° C., $[\alpha]_D^{20}=+119°$ (c=1%, acetone). Its analysis shows the formula and molecular weight as $C_{28}H_{36}O_6=468.59$—

As calculated: C=71.76%; H=7.7%.
As found: C=71.6%; H=7.7%.

This product has not been heretofore described in literature.

EXAMPLE 4

*Preparation of 21-Acetoxy Δ$^{16}$-Pregnene 3,20-Dione Starting from 21-Bromo Δ$^{16}$-Pregnene 3,20-Dione. See Diagram IV in Flow Sheet.*

The method described in Example 2 is followed and the following mixture is used:

Anhydrous sodium acetate _____g__ 50
Dimethylformamide _____cc__ 500
Crystallizable acetic acid _____cc__ 5
21-bromo Δ$^{16}$-pregnene 3,20-dione _____g__ 100

The above mixture, having been heated for two hours under a stream of nitrogen while being stirred, forms a solution which is chilled to −10° C. The resultant product is separated by centrifuging and washed with iced dimethylformamide, then with water, after which it is separated or centrifuged and dried.

There are produced 85 g. of pure 21-acetoxy Δ$^{16}$-pregnene 3,20-dione whose melting point=186° C., $[\alpha]_D^{20}=66°$ (c1=%, acetone), and which is identical with the derivative described in the applicants' copending patent application Serial No. 491,533 of March 1, 1955, now abandoned, entitled: "Substituted pregnane-diones and a process of making same," in which there is described the production of desoxycorticosterone acetate by the hydrogenation of the 16,17-double bond, bromination at the 4-position followed by dehydrobromination.

EXAMPLE 5

*Preparating of di-[Δ$^{16}$-Pregnene 21-ol 3,20-Dione] 21-Succinate Starting from 21-Bromo Δ$^{16}$-Pregnene 3,20-Dione. See Diagram V of Flow Sheet.*

The method described in Example 2 is followed and the following ingredients are used:

Dimethylformamide _____cc__ 10
Disodium succinate _____g__ 1
21-bromo Δ$^{16}$-pregnene 3,20-dione M.P.=188° C.,
 $[\alpha]_D^{20}=+54°$ C. (c=1%, ethanol) _____g__ 2

The product which is precipitated in water weighs 1.85 g. corresponding to a yield of 98% of di-[Δ$^{16}$-pregnene 21-ol 3,20-dione] 21-succinate. After recrystallization in acetone the product melts at 208° C. Its analysis shows the formula and molecular weight as:

$$C_{46}H_{62}O_8=742.96—$$

As calculated: C=74.36%; H=8.41%; O=17.23%.
As found: C=74.1%; H=8.6%; O=17.0%.

This product has not heretofore been described in literature.

EXAMPLE 6

*Preparation of 3α-Hydroxy 21-Acetoxy Δ$^{16}$-Pregnene 11,20-Dione Starting From 3α-Hydroxy 21-Bromo Δ$^{16}$-Pregnene 11,20-Dione. See Diagram VI of Flow Sheet.*

The method described in Example 2 is followed and the following ingredients are used:

Dimethylformamide _____cc__ 50
Anhydrous sodium acetate _____g__ 5
Crystallizable acetic acid _____cc__ 0.5
21-bromo 3α-hydroxy Δ$^{16}$-pregnene 11,20-dione, melting point=224° C. _____g__ 10

After the solution has been precipitated in water, separated or centrifuged, washed and dried, 9.3 g. of 3α-hydroxy 21-acetoxy Δ$^{16}$-pregnene 11,20-dione are produced, corresponding to a yield of 98% and having a melting point=200–201° C.

After recrystallization in acetone, its melting point=202° C., its $[\alpha]_D^{20}=+74°$ (c=1%, acetone). Its analysis shows the formula and molecular weight as: $C_{23}=H_{32}O_5=388.49$—

As calculated: C=71.1%; H=8.3%; O=20.59%.
As found: 71.2%; H=8.3%; O=20.8%.

This compound has not been heretofore described in literature.

It can be converted into 11-dehydrocorticosterone after saturation of the 16,17-double bond and transformation of the secondary alcohol at the 3-position into non-saturated α,β ketone according to methods generally used in steroid chemistry.

EXAMPLE 7

*Preparation of 4-Bromo 17α-Hydroxy 21-Acetoxy Pregnane 3,11,20-Trione Starting From 4,21-Dibromo 17α-Hydroxy Pregnane 3,11,20-Trione. See Diagram VII of the Flow Sheet.*

5 g. of 4,21-dibromo 17α-hydroxy pregnane 3,11,20-trione, the preparation of which has been described in the applications' Patent No. 2,768,191, are dissolved at 20° C. in 20 cc. of dimethylformamide. 1.2 g. of anhydrous sodium acetate and 0.1 cc. of acetic acid are added. The solution is then stirred 48 hours, during which time the crystallization of the 4-bromo 17α-hydroxy 21-acetoxy pregnane 3,11,20-trione makes constant progress. The solution is chilled to −10° C., then is separated or centrifuged, rinsed twice with 5 cc. of iced dimethylformamide each time, is washed with water, separated or centrifuged and dried.

This reaction produces 3.85 g., or a yield of 80%, of 4-bromo 17α-hydroxy 21-acetoxy pregnane 3,11,20-trione identical with the product described by T. F. Gallagher (J. Am. Chem. Soc., 1951, 73, 189). This product has a melting point=255° C., $[\alpha]_D^{20}=+110°$ (c=2%, acetone). The bromine as calculated=16.53%, and as found =16.7%.

By means of dehydrobromination according to methods described in literature this product supplies pure cortisone acetate.

EXAMPLE 8

*Preparation of 4-Bromo 17α-Hydroxy 21-Acetoxy Δ$^1$-Pregnene 3,11,20-Trione Starting From 4,21-Dibromo 17α-Hydroxy Δ$^1$-Pregnene 3,11,20-Trione. See Diagram VIII of Flow Sheet.*

The initial product 4,21-dibromo 17α-hydroxy Δ$^1$-pregnene 3,11,20-trione is prepared according to the process described in the applicants' patent application No. 627,134, of December 10, 1956, entitled: "Method of preparing unsaturated bromo-ketosteroids and products obtained," by reacting, in the medium of dimethylformamide, the lithium bromide/lithium carbonate combination with the 2α,4β,21-tribromo 17α-hydroxy pregnane 3,11,20-trione described in the applicants' patent application No. 577,321 of April 10, 1956.

1 g. of 4,21-dibromo 17α-hydroxy Δ¹-pregnene 3,11,20-trione, having a melting point=130° C., $[\alpha]_D^{20}=+162°$ (c=1%, acetone), is dissolved in 5 cc. dimethylformamide. 0.25 g. of anhydrous sodium acetate are added, and the solution is stirred for six hours at 20° C. The acetoxylated product at the 21-position precipitates as it is being formed. It is separated or centrifuged and rinsed with 1 cc. of dimethylformamide, washed with water and dried. This produces 4-bromo 17α-hydroxy 21-acetoxy Δ¹-pregnene 3,11,20-trione with a yield of 35%. It has a melting point=264° C., $[\alpha]_D^{20}=+178°$ (c=2%, tetrahydrofuran).

As calculated: Br=16.6%.
As found: Br=16.5%.

Treatment of the mother liquor permits recovery of additional quantities of the product.

By zinc debromination in acetic acid, this product directly produces a yield of 85% of 17α-hydroxy 21-acetoxy Δ¹-pregnene 3,11,20-trione, whose melting point=244° C., and $[\alpha]_D^{20}=+137°$ (c=0.5%, acetone), while its dehydrobromination produces Δ¹-dehydrocortisone (prednisone) in the form of 21-acetate.

EXAMPLE 9

*Preparation of 4,17β-Diacetoxy Etiocholane 3-one Starting From 4-Bromo 17β-Acetoxy Etiocholane 3-one. See Reaction IX of Flow Sheet.*

4.8 g. of lithium acetate are added to 100 cc. of dimethylformamide. The solution is heated to 100° C., 7 cc. water are added to produce a solution. Then 10 g. of 4-bromo 17β-acetoxy etiocholane 3-one, melting point=187° C., are added, the preparation of which has been described by L. F. Fieser (J. Am. Chem. Soc., 1953, 75, 1704). The solution is then stirred for 4 hours at 95° C., whereupon it is cooled and poured into ice water.

The precipitate of 4,17β-diacetoxy etiocholane 3-one is separated or centrifuged, washed with water and then dried. A single recrystallation in ethanol produces the pure product, whose melting point=218° C., $[\alpha]_D^{20}=-16°$ (c=1%, chloroform). Its analysis shows the formula and molecular weight as $C_{23}H_{34}O_5=390.5$—

As calculated: C=70.74%; H=8.77%; O=20.49%.
As found: C=70.5%; H=8.8%; O=20.6%.

This product has not heretofore been described in literature.

Proceeding in the same manner as described in the examples, using the same or equivalent solvents and media, it is possible to prepare from:

(1) 4,21-dibromo 17α-hydroxy pregnane 3,11,20-trione and lithium hexahydrobenzoate, the corresponding 4-bromo 21-hexahydrobenzoate which, by dehydrobromination at the 4,5-position produces cortisone hexahydrobenzoate.

(2) From 3α,12α-diacetoxy 21-bromo 24,24-diphenyl $\Delta^{20(22)23}$-choladiene and sodium acetate, 3α,12α,21-triacetoxy 24,24-diphenyl $\Delta^{20(22)23}$-choladiene.

(3) From 21-bromo 3α-acetoxy Δ¹⁶-pregnene 20-one and sodium acetate, 3α,21α-diacetoxy Δ¹⁶-pregnene 20-one.

From the foregoing description taken in conjunction with the accompanying sketch showing the reactions according to the examples given, it will be noted that there is disclosed a process for the quantitative acyloxylation of steroids by the direct action of an alkaline salt on the halogenated derivative of a steroid in the presence of a dialkyl and like formamide and its equivalents.

The products disclosed herein have been found useful in the field of medicine as an aid to successful treatment of the human body.

It is understood that various modifications and changes may be made in the use of ingredients, equivalents, solvents and other compounds and materials may be made without departing from the spirit and scope of the invention as claimed.

The final products possess physiological activity or can serve as intermediates for the preparation of other compounds of therapeutic value.

We claim:

1. Di-[Δ¹⁶-pregnene 21-ol 3,20-dione] 21 - succinate.

2. 3α-hydroxy 21-acetoxy Δ¹⁶-pregnene 11,20-dione having a melting point of about 202° C. and a rotatory power $[\alpha]_D^{20}$ of about +74° (concentration: 1% in acetone).

3. In a process of producing 3α,17α-dihydroxy-21-formyloxy pregnane-11,20-dione, the steps which comprise heating 3α,17α-dihydroxy-21-bromo pregnane-11,20-dione in dimethyl formamide with sodium formate at a temperature between room temperature and the boiling temperature of the mixture and separating the resulting formyloxylated reaction product from the reaction mixture.

4. In a process of producing 3α,17α-dihydroxy-21-benzoyloxy pregnane-11,20-dione, the steps which comprise heating 3α,17α-dihydroxy-21-bromo pregnane-11,20-dione in dimethyl formamide with sodium benzoate at a temperature between room temperature and the boiling temperature of the mixture and separating the resulting benzoyloxylated reaction product from the reaction mixture.

5. In a process of producing 21-acetoxy-Δ¹⁶-pregnane-3,20-dione, the steps which comprise heating 21-bromo-Δ¹⁶-pregnane-3,20-dione in dimethyl formamide with sodium acetate in the presence of acetic acid at a temperature between room temperature and the boiling temperature of the mixture and separating the resulting acetoxylated reaction product from the reaction mixture.

6. In a process of producing di-(Δ¹⁶-pregnene-21-ol-3,20-dione)-21-succinate, the steps which comprise heating 21-bromo-Δ¹⁶-pregnene-3,20-dione in dimethyl formamide with sodium succinate at a temperature between room temperature and the boiling temperature of the mixture and separating the resulting succinate from the reaction mixture.

7. In a process of producing 3α-hydroxy-21-acetoxy-Δ¹⁶-pregnene-11,20-dione, the steps which comprise heating 3α-hydroxy-21-bromo-Δ¹⁶-pregnene-11,20-dione in dimethyl formamide with sodium acetate in the presence of acetic acid between room temperature and the boiling temperature of the mixture and separating the resulting acetoxylated product from the reaction mixture.

8. In the process of producing 4-bromo-17α-hydroxy-21-acetoxy pregnane-3,11,20-trione, the steps which comprise stirring 4,21-di-bromo-17α-hydroxy pregnane-3,11,20-trione in dimethyl formamide with sodium acetate in the presence of acetic acid at room temperature and separating the resulting acetoxylated reaction product from the reaction mixture.

9. In the process of producing 4-bromo-17α-hydroxy-21-acetoxy-Δ¹-pregnene-3,11,20-trione, the steps which comprise stirring 4,21-dibromo-17α-hydroxy-Δ¹-pregnene-3,11,20-trione in dimethyl formamide with sodium acetate in the presence of acetic acid at room temperature and separating the resulting acetoxylated reaction product from the reaction mixture.

10. In a process of producing acyloxylated steroid compounds selected from the group consisting of 3α,17α-dihydroxy-21-acyloxy pregnane-11,20-dione; 21-acyloxy-Δ¹⁶-pregnene-3,20-dione; 3α-hydroxy-21-acyloxy-Δ¹⁶-pregnene-11,20-dione; 4-bromo-17α-hydroxy-21-acyloxy pregnane-3,11,20-trione; and 4-bromo-17α-hydroxy-21-acyloxy-Δ¹-pregnene-3,11,20-trione from the corresponding 21-bromo steroid compounds, the steps which comprise heating said bromo steroid starting material in dimethyl formamide with an alkali metal salt of an organic acid selected from the group consisting of a lower fatty acid, benzoic acid, and succinic acid at a temperature between room temperature and the boiling temperature of the mixture, and separating the resulting acyloxylated steroid compound from the reaction mixture.

References Cited in the file of this patent

UNITED STATES PATENTS 2,683,723    Hogg _____ July 13, 1954
2,752,339    Julian et al. _____ June 26, 1956
2,797,230    Nicholls et al. _____ June 25, 1957

OTHER REFERENCES

J. Amer. Chem. Society., vol. 77 (1956), article by Thompson et al., p. 172.

J. Amer. Chem. Society, vol. 74 (1953), article by Gallagher et al., p. 172.